(12) United States Patent
Gai et al.

(10) Patent No.: US 8,047,152 B2
(45) Date of Patent: Nov. 1, 2011

(54) HINGE JOINT FOR CYLINDER ACTUATORS OF WATERCRAFT TRIM TABS, TRIM TAB AND TRIM TAB CONTROL SYSTEM

(75) Inventors: Giorgio Gai, Genoa (IT); Alessandro Staiolo, Ronco Scrivia (IT)

(73) Assignee: Ultraflex S.p.A., Casella (GE) (IT)

( * ) Notice: Subject to any disclaimer, the term of this patent is extended or adjusted under 35 U.S.C. 154(b) by 245 days.

(21) Appl. No.: 12/430,210

(22) Filed: Apr. 27, 2009

(65) Prior Publication Data
US 2009/0277369 A1  Nov. 12, 2009

(30) Foreign Application Priority Data

May 6, 2008 (IT) .................. DE2008A40

(51) Int. Cl.
*B63B 1/22* (2006.01)
(52) U.S. Cl. ........................ 114/285; 114/286
(58) Field of Classification Search ........... 114/285–287
See application file for complete search history.

(56) References Cited

U.S. PATENT DOCUMENTS

| 3,391,667 | A | | 7/1968 | Lo Bue |
| 3,577,948 | A | | 5/1971 | Frey |
| 4,363,249 | A | * | 12/1982 | Stugart ........................ 477/99 |
| 4,600,395 | A | | 7/1986 | Pichl |
| 5,113,780 | A | * | 5/1992 | Bennett et al. ............... 114/286 |
| 5,474,013 | A | * | 12/1995 | Wittmaier .................... 114/286 |
| 5,524,567 | A | | 6/1996 | Astley et al. |
| 6,493,905 | B2 | * | 12/2002 | Stettler ........................ 16/271 |
| 2007/0137550 | A1 | * | 6/2007 | Davis et al. .................. 114/285 |

* cited by examiner

*Primary Examiner* — Stephen Avila
(74) *Attorney, Agent, or Firm* — Themis Law

(57) ABSTRACT

A joint connecting a cylinder actuator of a trim tab to a watercraft includes a first part couplable to a wall of the watercraft, a second part couplable to the cylinder actuator, a pin coupled to one part and a pin seat formed in the other part. In one embodiment, the seat is defined by a portion of a circular cylindrical surface having an opening on one side. The surface portion has an angular extension larger than 180°, and the pin has a correspondingly cylindrical portion with a laterally flattened surface for introduction into the opening of the pin seat. The opening of the cylindrical pin seat and the flattened portion/s of the pin are in such reciprocal angular positions that the two joint parts are operably connectable and disconnectable by disposing them in a relative angular position, which cannot be attained in the mounted operating condition.

29 Claims, 14 Drawing Sheets

HINGE JOINT FOR CYLINDER ACTUATORS OF WATERCRAFT TRIM TABS, TRIM TAB AND TRIM TAB CONTROL SYSTEM

FIELD OF THE INVENTION

The present invention relates to a joint for connecting a cylinder actuator of a trim tab to a watercraft, comprising a first part designed to be fixed to a wall of the watercraft, a second part designed to be fixed to one end of the cylinder actuator, at least one pin integral with one of said two parts and at least one pin seat formed in the other of said two parts which is adapted to receive said pin to form a hinge connection.

BACKGROUND OF THE INVENTION

Many watercrafts currently use trim tabs mounted to the transom for attitude control during navigation. Trim tabs, which are also known as "stabilizers", "trim controls" or "flaps", are movable plate-like extensions of the hull, usually made of metal, that are hinged to the transom flush with the keel and driven by one or more cylinder actuators to variously tilted positions relative to the keel.

Like in aircraft flaps, appropriate control of watercraft trim tabs provides control of the hydrodynamic force which tends to lift the stern, and consequently lower the bow, thereby ensuring the ideal pitch attitude for navigation in a variety of conditions, for instance according to load distribution, speed, weather and other variables.

Each trim tab is generally driven by a cylinder actuator having ends hinged to the transom and to the trim tab. Such cylinder actuators may be of a hydraulic or electric type and are well known in the art. For instance, U.S. Pat. No. 5,881,666 discloses an electrical cylinder actuator. The actuator disclosed in this document, like all currently available actuators, has slots at its ends for pins designed to secure it to corresponding fixing plates having a coaxial lug integral with the trim tab and with the transom to form hinge connections that allow oscillation of the trim tab according to the length of the piston rod. These connections are obtained by fastening the fixing plates to the corresponding surfaces of the trim tab and/or the transom, by transversely fitting the slots of the cylinder into alignment with the lugs and by axially mounting a pin into the slots/lugs so aligned. Otherwise, the cylinder may be equipped with a hinge already mounted to a fixing plate to be fastened to the corresponding surfaces of the trim tab and the transom. In both cases, the mounting/removal process is particularly laborious and generally requires highly skilled personnel. On the other hand, the cylinder actuator, like any materials designed to operate in contact with seawater, is subjected to wear and often requires maintenance, and hence repeated mounting/removal procedures.

SUMMARY OF THE INVENTION

The object of the present invention is to provide a connection, which at least partially obviates the above drawback in a simple and reliable manner, so that cylinder actuators of watercraft trim tabs may be easily, practically and quickly mounted and removed even by unskilled personnel.

The invention fulfils the above object by providing a joint, in which the pin seat is defined by a portion of a circular cylindrical surface having an opening on one side for introduction and removal of the pin into and from the pin seat. The pin is displaced during introduction and removal into and from the seat, for example, may be displaced transversely, particularly perpendicularly, to the radial direction related to the axis of the pin and/or the cylindrical seat. Such portion of the cylindrical surface may have an angular extension of more than 180°.

The pin has a correspondingly cylindrical portion with a laterally flattened surface allowing introduction thereof into the opening of the pin seat. Such opening of the cylindrical pin seat for pin introduction and removal via the flattened portion/s of the pin are located in the cylindrical surface of the cylindrical seat and respectively on the outer cylindrical surface of the pin in such angular positions, with respect to the position in which the seat is fixed to a wall of the watercraft and to the position in which the cylinder actuator is fixed to the trim tab, that the two joint parts are operably connectable/disconnectable when they assume a relative angular position, which cannot otherwise be attained by the joint in the normal operating state.

Advantageously, the portion of the pin that is designed to cooperate with the pin seat has a circular segment cross section with an angular extension of more than 180° and a height smaller than the width of the seat opening, whereas the two joint parts preferably have perfectly mating shapes in the connected state to form a very compact connection device.

In practice, the joint of the invention provides a removable hinge, with practically and quickly connecting/disconnecting parts, which affords the same safety as prior art hinges, thanks to a coupling/uncoupling mechanism that cannot be actuated during normal operation of the trim tab. This type of operation is allowed by the lateral opening of the lug hole and the corresponding flattening portion of the pin, which allow the parts to mate only when they are in a given angular position.

In one embodiment, one of the two joint parts comprises a fixing plate having at least one pair of lugs with a coaxial cylindrical hole, within which the pin associated with the other joint part rotates freely. Each hole delimiting wall has a corresponding lateral, radial opening for the pin to be inserted therein in a direction transverse to the hole axis when the flattened surface of the pin is brought to alignment with the radial openings by rotation of one joint part relative to the other. The lugs also may be connected together at the side opposite to the opening of the respective holes, thereby providing a particularly firm support to pin insertion. Typically, the joint part integral with the pin includes a tab with two opposed flat surfaces. The lugs are longitudinally spaced for the tab to be interposed between the lugs substantially in the middle when the joint is in the connected state, thereby forming a hinge equivalent in all respects to those of the prior art. The tab has two coaxial pin stumps at its opposed surfaces, which are designed to engage with the hole of the corresponding lugs. In particular, each pin stump is disposed orthogonally to the corresponding surface of the tab and has a flattened portion of such size to allow passage thereof through the lateral opening of the hole of the corresponding lug when the flattened portion is brought to alignment with the lateral opening of the hole by rotation of the tab relative to the fixing plate or vice versa. The alignment positions of the flattened portions of the pin with the radial openings of the holes are a relative angular position of the opening of the holes with the flattened portions, which cannot be attained when the actuator is in the mounted and operating state.

The pin or pin stumps may be glued and/or welded and/or formed of one piece with the tab of the cylinder actuator, particularly by molding or casting, or the pin may be press fitted and locked into a hole of the tab to project by its two opposite ends from the two opposite faces of the tab. The same applies to the lugs, which may be glued and/or welded and/or formed of one piece with the fixing plate, particularly by molding or casting.

In view of the foregoing and as further shown hereinbelow, the two lugs that act as supports for the hinging pin ends or stumps have recesses for receiving the two pin ends or the two stumps and form a kind of fork for supporting the hinging pin. Such fork has openings for receiving the pin ends or the two stumps in that position and with a width smaller than the diameter of the pin or the two stumps, whereby the pin ends or stumps must have one or more diameter-reducing flattened portions, to be fitted into the seat. Conversely, the flattened portions and openings of the seat are in such a position relative to the angular operating position of the cylinder actuator that the flattened portions on the pin ends or stumps cannot be angularly aligned with the seat openings and slip off the respective seats through their openings.

In prior art systems, the power cable/duct to the cylinder actuator typically crosses the transom via a bulkhead feedthrough to reach the cylinder actuator, with which it is connected, via a cable sleeve that operates against the head of the cylinder actuator. Thus, the cable/duct has an external path that is designed to be in contact with water and that is subjected to wear. In a particularly advantageous embodiment of the joint of the invention, the cable/duct may be arranged to pass through a watertight seat which prevents contact with water for increased durability and reliability. For this purpose, the joint parts have an internal guide passage which actually consists of an essentially central, particularly axial hole or conduct formed in the tab, and a corresponding hole formed in the fixing plate which is designed to be aligned with the hole or conduit of the tab at a given angular position of the joint. This angular position corresponds, for instance, to the relative position that allows connection/disconnection of the joint parts. Advantageously, the end section of the internal guide passage is widened at the end of the joint part associated with the pin or pin stumps and facing toward the fixing plate, particularly in the tab associated with the cylinder actuator. This configuration allows the two joint parts to oscillate when the internal guide passage holds the power duct or cable, with the widened portion extending angularly about an axis parallel to the axis of oscillation of the two joint parts. These arrangements provide for a very compact joint with an integrated cable sleeve feature.

The joint advantageously has means for fastening the part related to the pin seats to the watercraft wall and also for fastening the part related to the pin/s to one end of the cylinder actuator. These means are typically associated respectively with the fixing plate and the tab. In particular, the fastening means associated with the tab include a terminal, which is designed to be press fitted or screwed into a corresponding element of the cylinder actuator. The terminal typically consists of or is integral with the head or cover of the cylinder actuator and has peripheral holes for receiving a fastener, for example, a screw fastener.

In one embodiment, the terminal has an outlet hole for the duct or cable received in the guide passage, and watertight fastening means are further provided between the duct or cable and the outlet hole. Advantageously, the watertight fastening means include a cable sleeve which operates against the head or cover of the cylinder actuator from the interior of the cylinder to the terminal of the joint, thereby forming a sealing mechanism that is completely different from prior art systems, in which the cable sleeve operates against the cylinder head from the exterior to the interior of the cylinder. Through this arrangement, cylinder actuators may have one open end, because the head or cover may be associated directly with the joint for higher flexibility and easier mounting/removal.

In another aspect, the invention relates to a watercraft comprising a trim tab hinged to the transom for attitude control, in which a trim tab is driven by a cylinder actuator connected to the transom via a joint as described above.

In yet another aspect, the invention relates to a control system for controlling the attitude of a watercraft that includes at least one trim tab hinged to the transom of the watercraft, a pneumatic or electric cylinder actuator hinged at one end to the trim tab and at the other end to the transom via a joint according to the invention, and a hydraulic or electric control device connected to the cylinder actuator through a pneumatic duct or an electric cable partially held in the internal guide passage of the joint. The piston rod has such a maximum length that, in operation, the angular position corresponding to the disengagement state of the joint parts is not attained.

Additional features and improvements provided by the invention are recited the dependent claims.

BRIEF DESCRIPTION OF THE DRAWINGS

The features of the invention and the advantages derived therefrom will be more apparent from the following detailed description of the enclosed drawings, in which.

DETAILED DESCRIPTION OF THE INVENTION

Figure 1:
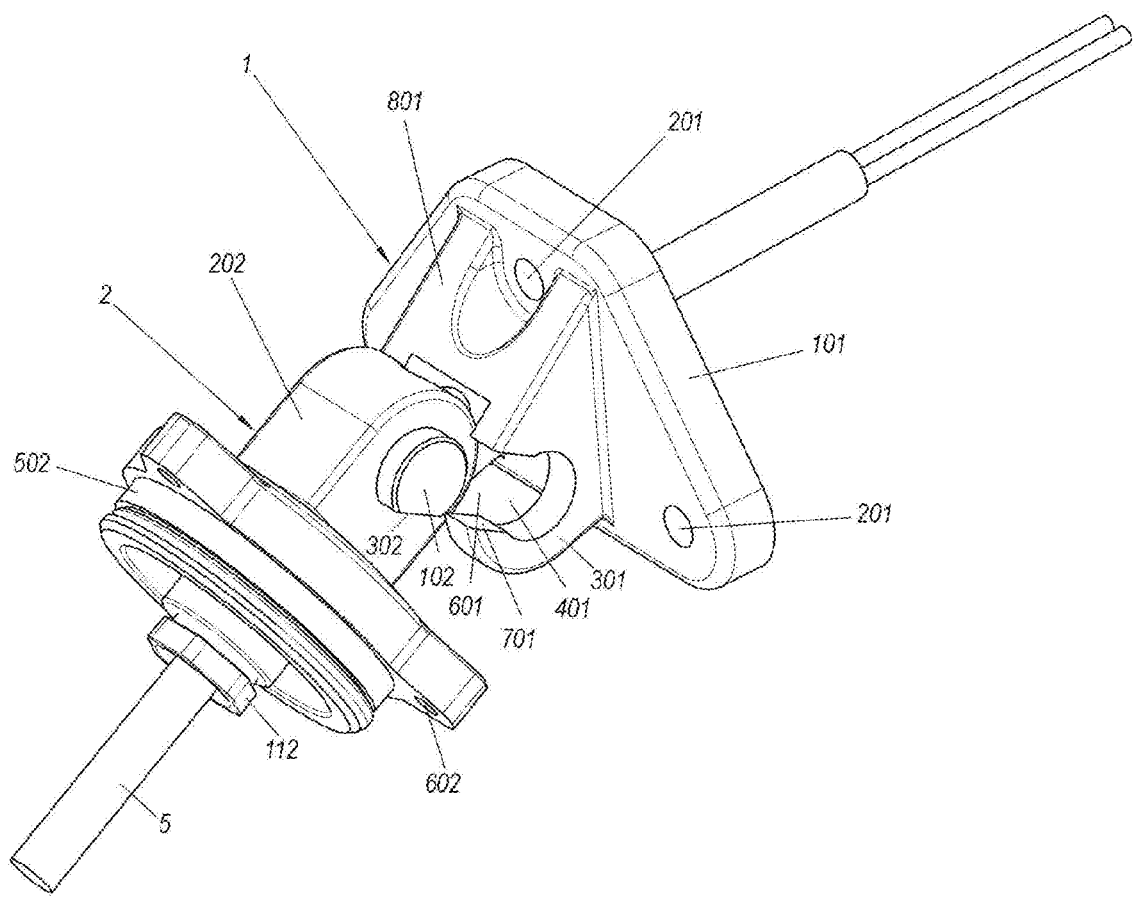
FIGS. 1, 2 and 3 are side perspective views of one embodiment of the joint of the invention having three distinct steps of connection of the two parts thereof.
Figure 2:
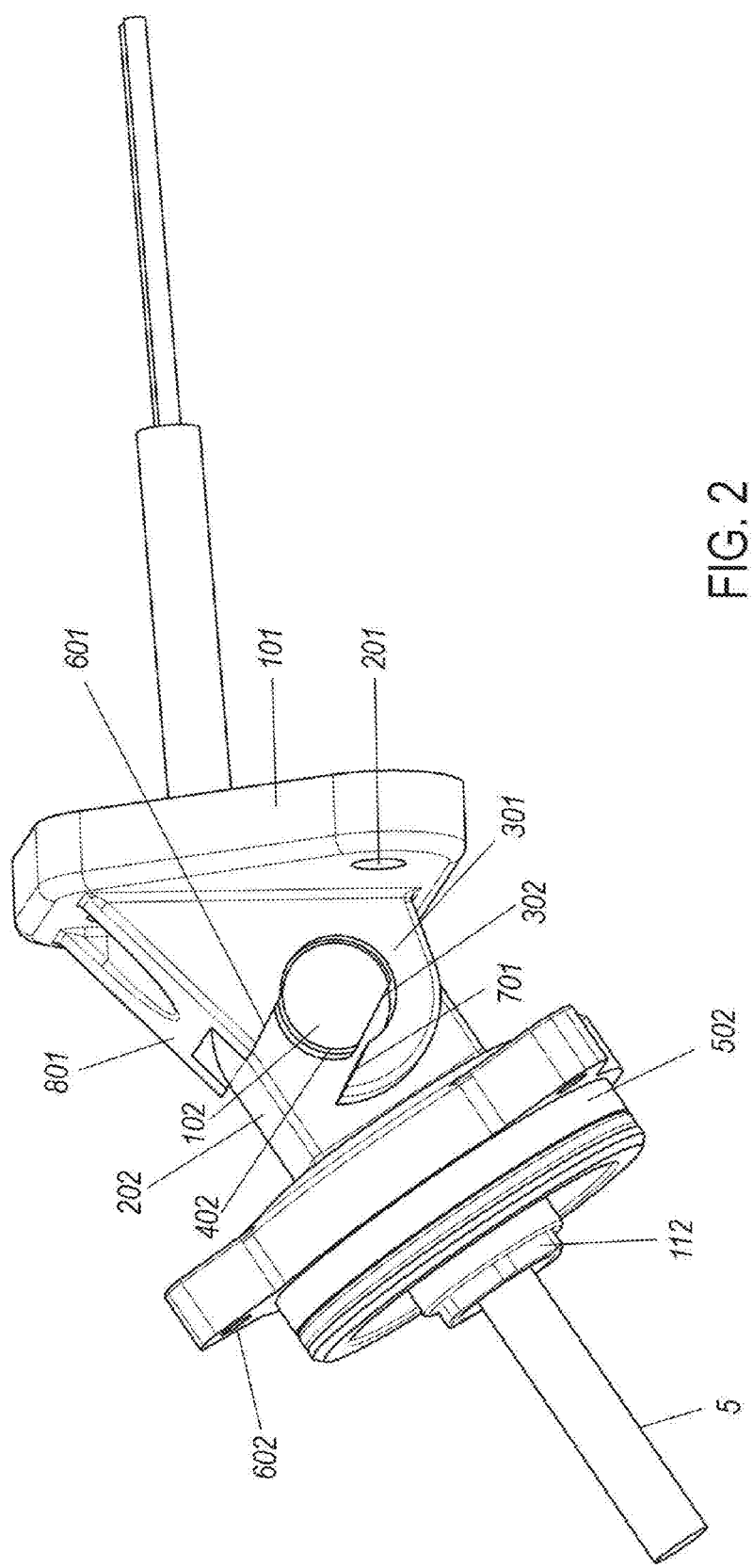
Figure 3:
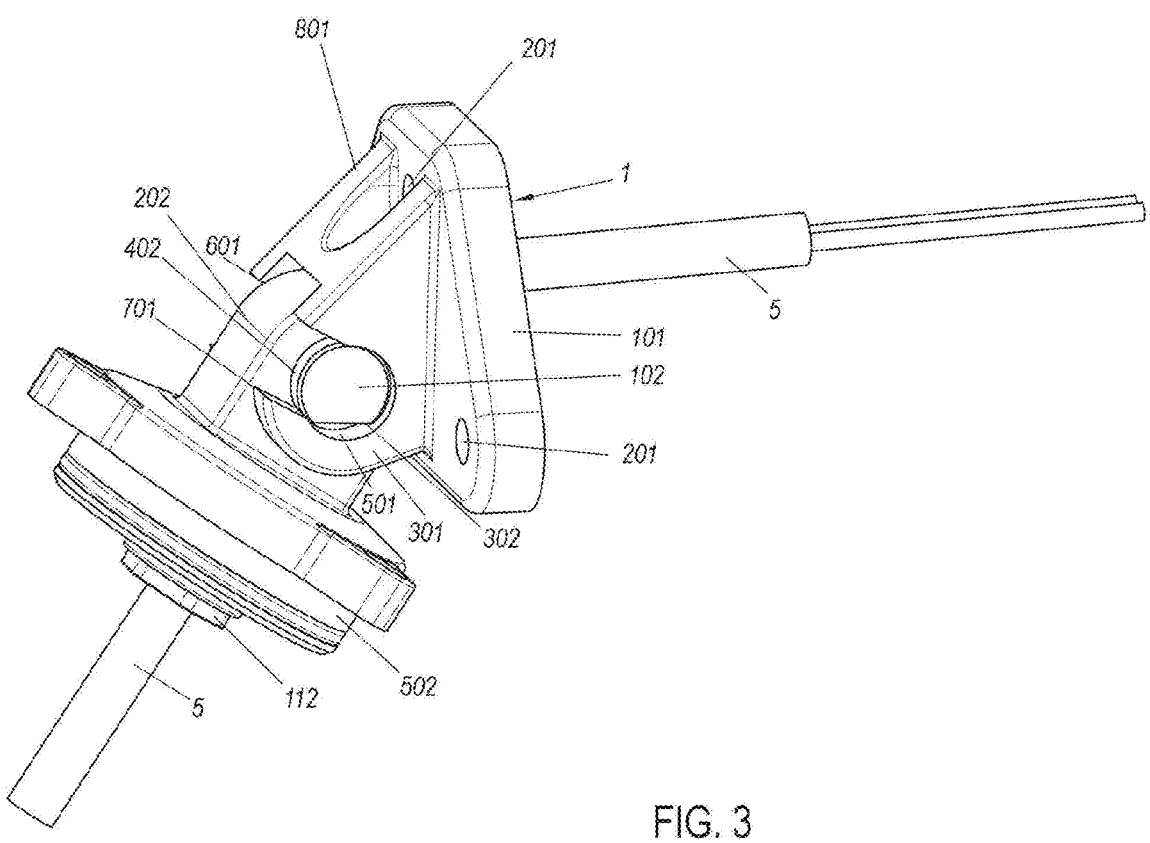
Figure 4:
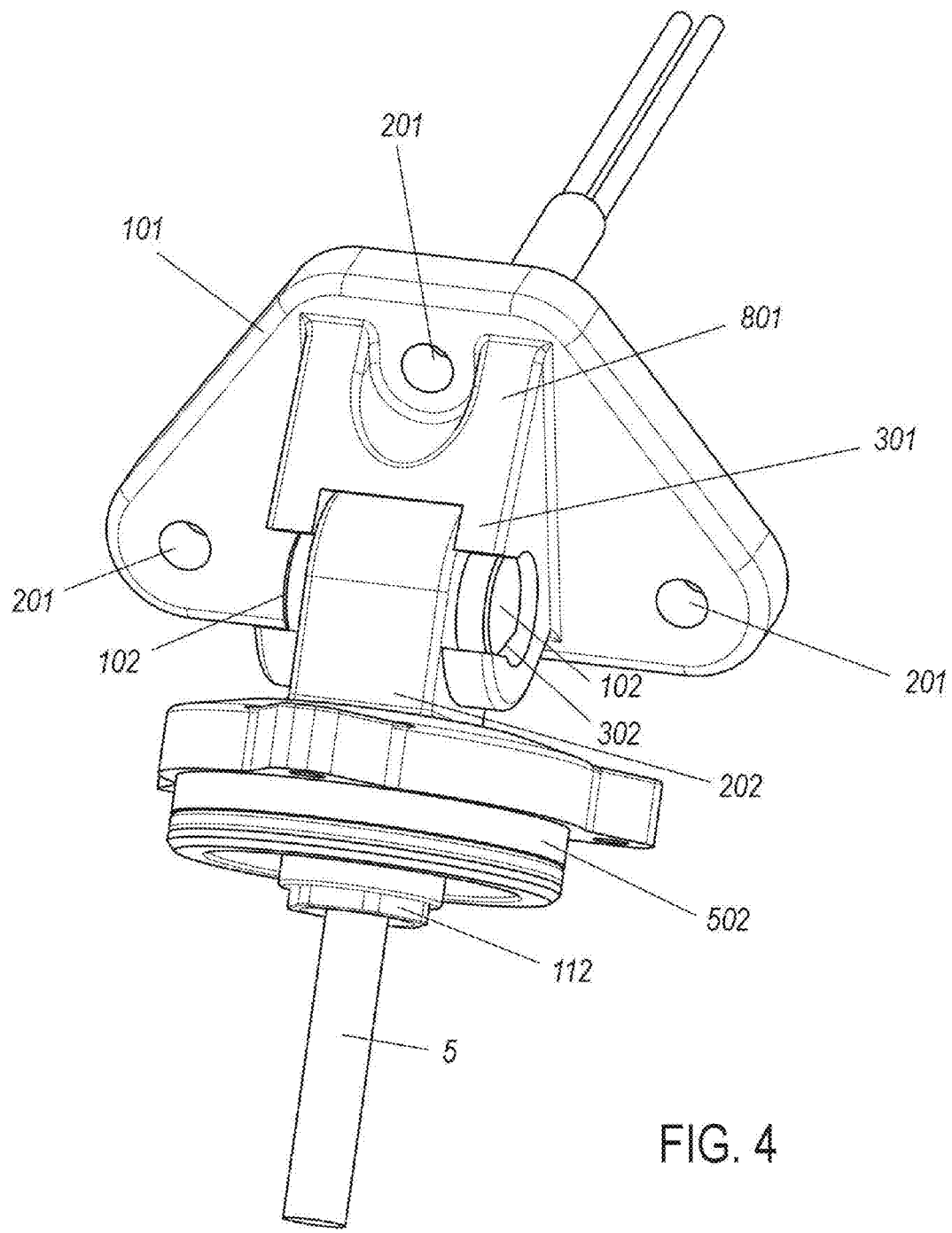
FIG. 4 is a top perspective view of the joint shown in FIG. 3.

Referring to FIGS. 1 to 3, the joint is composed of two distinct parts 1, 2 comprising the pin seat and the hinge tab respectively.

The part 1 consists of a triangular fixing plate 101 having three peripheral holes 201 in the proximity of the vertices, allowing it to be fastened to the watercraft wall 4 by screws or bolts. Two lugs 301 are provided at the center, on the side away from the wall and orthogonal to the plate 101, each having a coaxial hole 401. The lugs 301 are preferably formed of one piece, particularly by casting or molding, with the plate 101 and are interconnected at the upper part by a stiffening rib 801.

The holes in the lugs 401 have a lateral radial opening 601 for transversely receiving the two pin stumps 102 of the tab 202 of the joint part 2. Each opening 601 has an angular extension of less than 180°, to ensure a sufficient guide surface to the corresponding pin stump during rotation and to prevent its disengagement during operation. Each pin stump 102 has a diameter slightly smaller than the diameter of the lug holes and has a lateral flattened portion 302 so that its cross section can form a circular segment having an angular extension of more than 180° and a height smaller than the width of the opening of the corresponding lug.

Connection of two joint parts is achieved by the following steps:

rotating the tab 202 relative to the lugs 301 until of the flattened portion 302 of each pin stump 102 is aligned with the lower delimiting surface 701 of the corresponding opening 601, as shown in FIG. 1;

translating the tab 202 for the pin stumps 102 to be transversely fitted into the corresponding openings 601 as shown in FIG. 2;

rotating the tab 202 until each flattened portion 302 is no longer aligned with its respective opening 601, as shown in FIG. 3, so that the part 402 of the pin stumps next to the opening 601 can interfere with the opening, thereby preventing the stumps 102 from disengaging from the hole of the lugs 301.

The above steps relate to a configuration in which the second part 2 is designed to rotate and translate relative to the first part 1, but it shall be understood that the connection/disconnection of the joint is caused by the motion of any part relative to the other.

The angular position of the opening 601 of the hole 401 of the lugs 301 relative to the fixing plate 101 and the position of the flattened portion 302 at the ends of the pin 102 relative to the axis of the cylinder actuator 2, with whose tab 202 it is connected, defines the maximum possible oscillation of the joint before the latter reaches the disconnection position. The figures show, for example, a configuration in which the angle between the axis of the openings and the plane that passes through the surface of the plate is more than 90°, although different angles may be envisaged.

The joint part 2 that carries the tab 202 has a cap or cover element at the end portion, on the side away from the hinge, which is adapted to engage with one of the ends 103 of the cylinder actuator 3 (FIG. 11A) with the interposition of seals. The cap or cover 502 has peripheral holes 602, through which it may be fastened by screw or bolt means to corresponding annular flange-like surfaces of the cylinder 3 and is advantageously formed of one piece with the tab 202, particularly by molding or casting. The above mentioned end preferably forms a proper cover, which is sealably press fitted onto an open-ended cylinder, but may be easily modified for connection with a closed-ended actuator, such as by screw fastening onto a ring nut.

Figure 5:
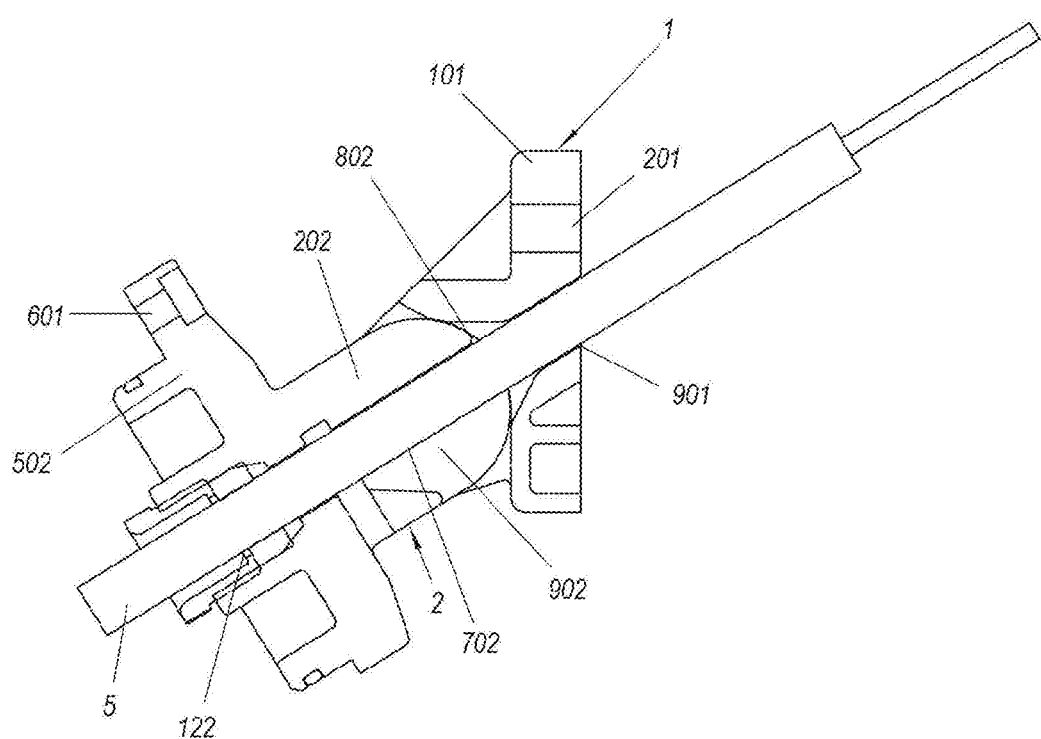
FIGS. 5 and 6 are sectional views of the joint shown in FIGS. 2 and 3.
Figure 6:
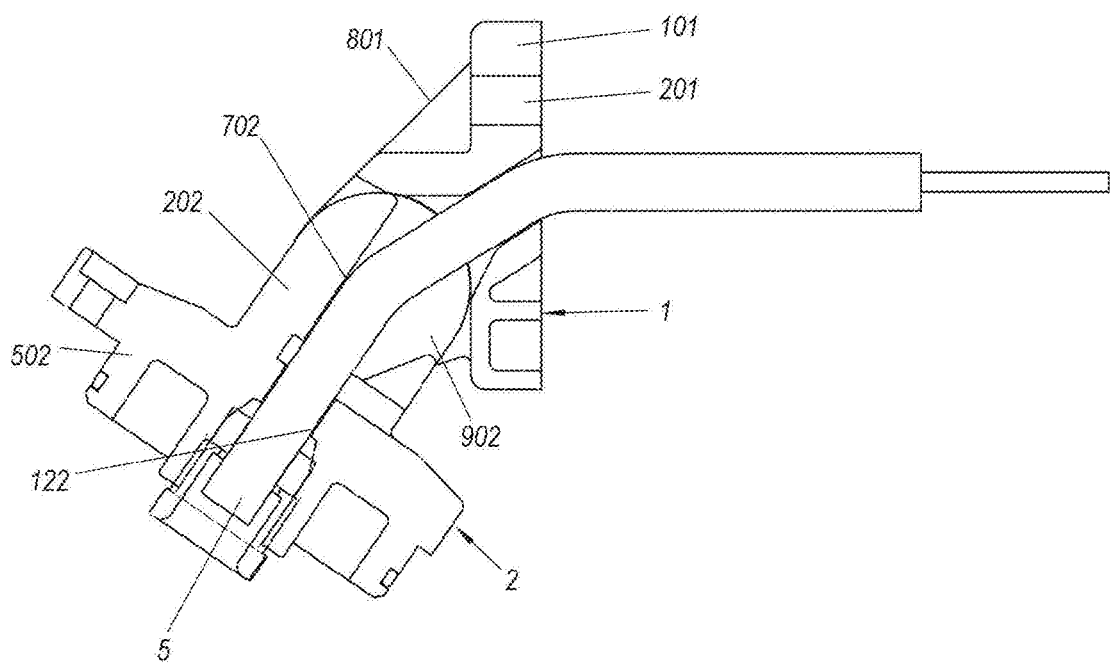
Figure 7:
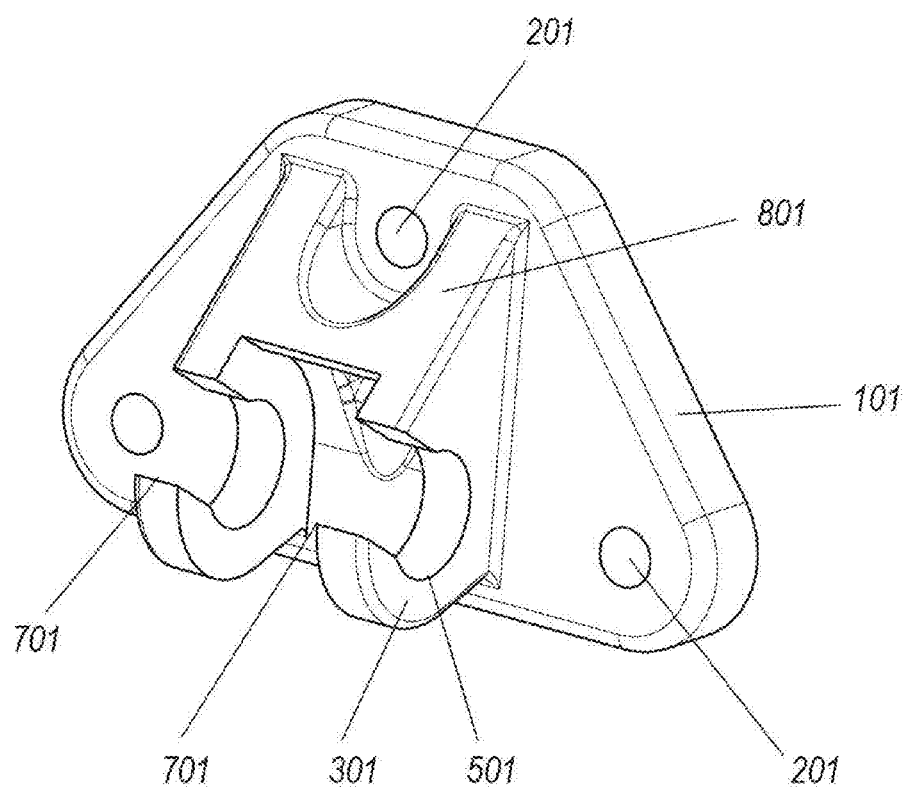
FIGS. 7, 8 are side perspective views of the two separate joint parts.
Figure 8:
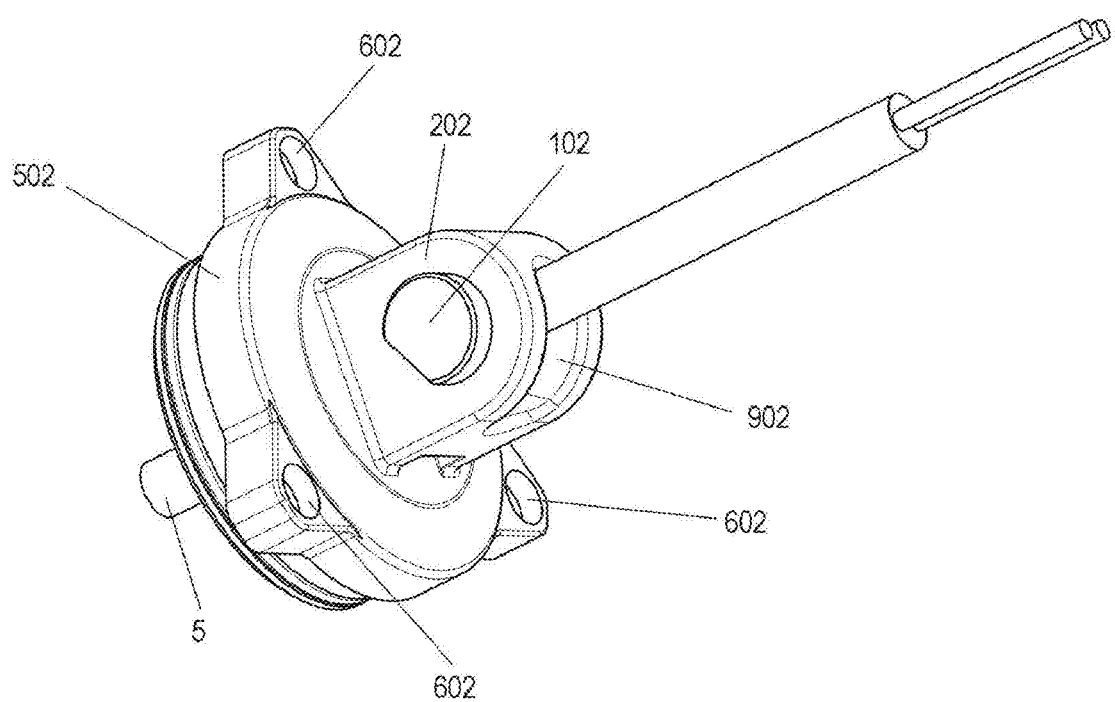
Figure 9:
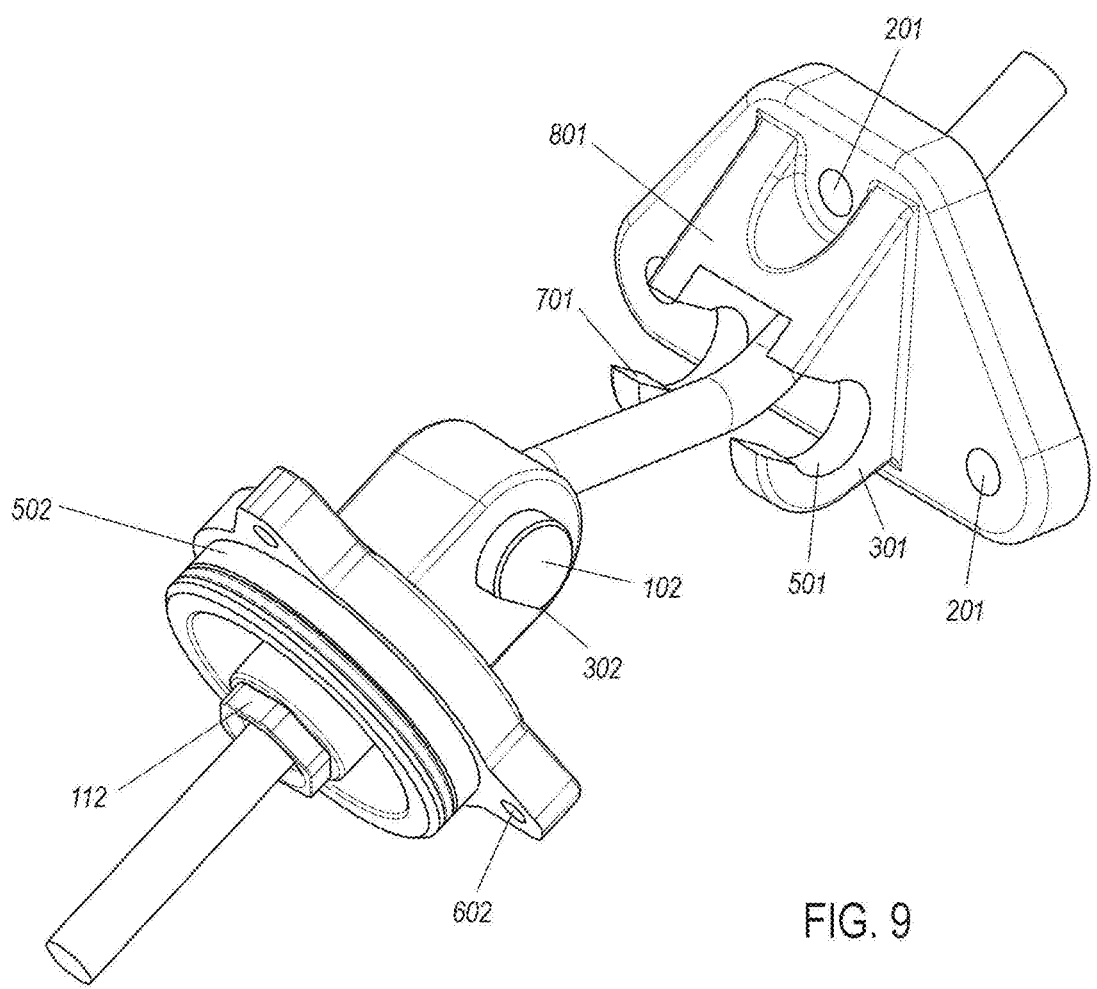
FIG. 9 is a side perspective view of the two decoupled parts of the joint of FIGS. 2 and 3 with the power cable mounted thereto.
Figure 10:
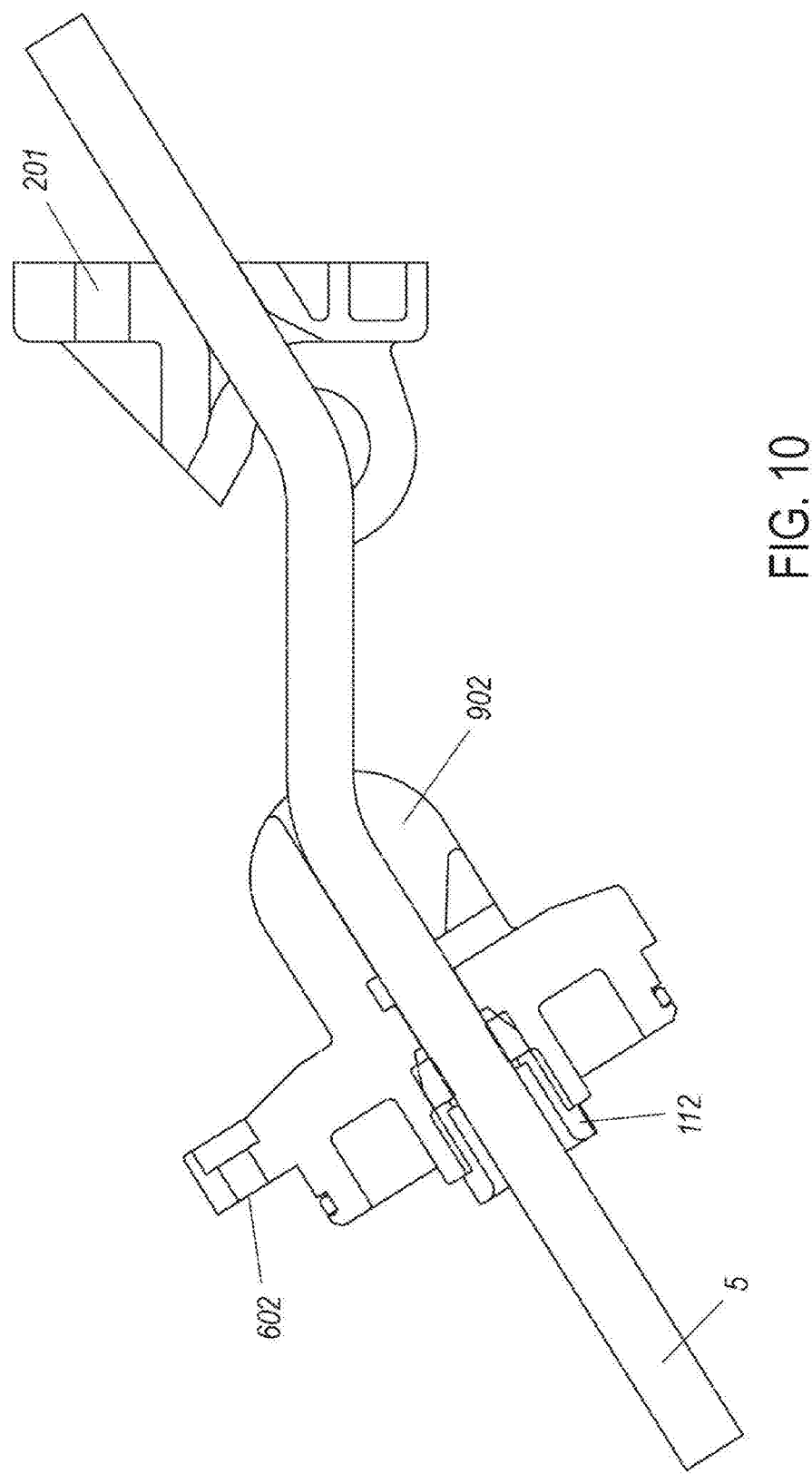
FIG. 10 is a sectional view of the joint of FIG. 9.

The joint of the invention is particularly advantageous, not only in that it forms a removable hinge that facilitates mounting/removal of the cylinder actuator 3 in a watercraft trim system, but also in that, by particular arrangements, it can also act as a cable sleeve between the cylinder actuator 3 and the watercraft wall 4. For this purpose, an internal guide passage is provided, in a substantially central position, for holding a power duct or cable 5 of the cylinder actuator 3 as shown in FIGS. 5 and 6 for two different angular positions of the joint.

The guide passage substantially consists of a hole or duct 702, which axially crosses the second joint part 2 from the end 802 of the tab 202 facing toward the fixing plate 101 to the opposite end that carries the cover 502 of the cylinder actuator 3. The fixing plate 101 has a corresponding hole 901, which is aligned with the outlet hole or duct of the tab 202 in a given angular position of the joint parts 1, 2, e.g. the connection/disconnection position. In order to prevent the cable or duct 5 from hindering joint oscillation during operation, the tab 202 has a widened portion 902 of the internal guide portion in the end 802 facing toward the fixing plate 101. The widened portion 902 has a "delta" shaped angular extension about an axis parallel to the axis of oscillation of the two joint parts, particularly about the hinge axis. The radial extension of the widened portion 902 is related to the maximum oscillation of the joint and hence, in one embodiment, it substantially coincides or is slightly smaller than the angle that defines the axial position of the opening 601 of the hole 401 of the lugs 301 which, as mentioned above, defines the joint disconnection position.

The device finally includes the cable sleeve 112 that operates against the cover 502 of the cylinder actuator 3 or of the end of the joint part that is designed to be attached thereto, and a bulkhead feedthrough (not shown) which operates from the interior of the watercraft against the transom wall 4, which has the plate 101 of the joint mounted thereto and has a hole therein for the passage of the power duct or cable 5.

Figure 11B:
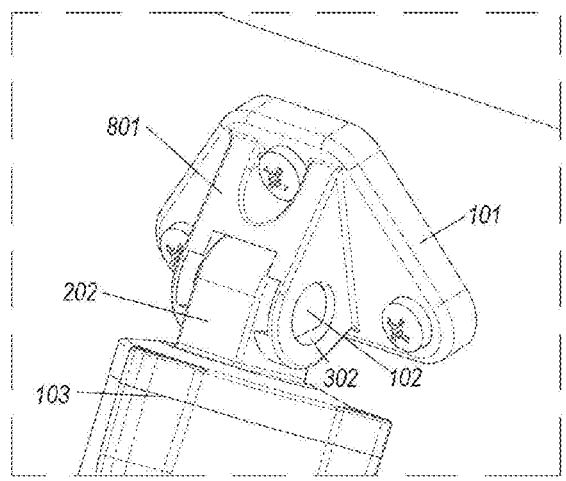
FIG. 11B is an enlarged detail of FIG. 11A.
Figure 11A:
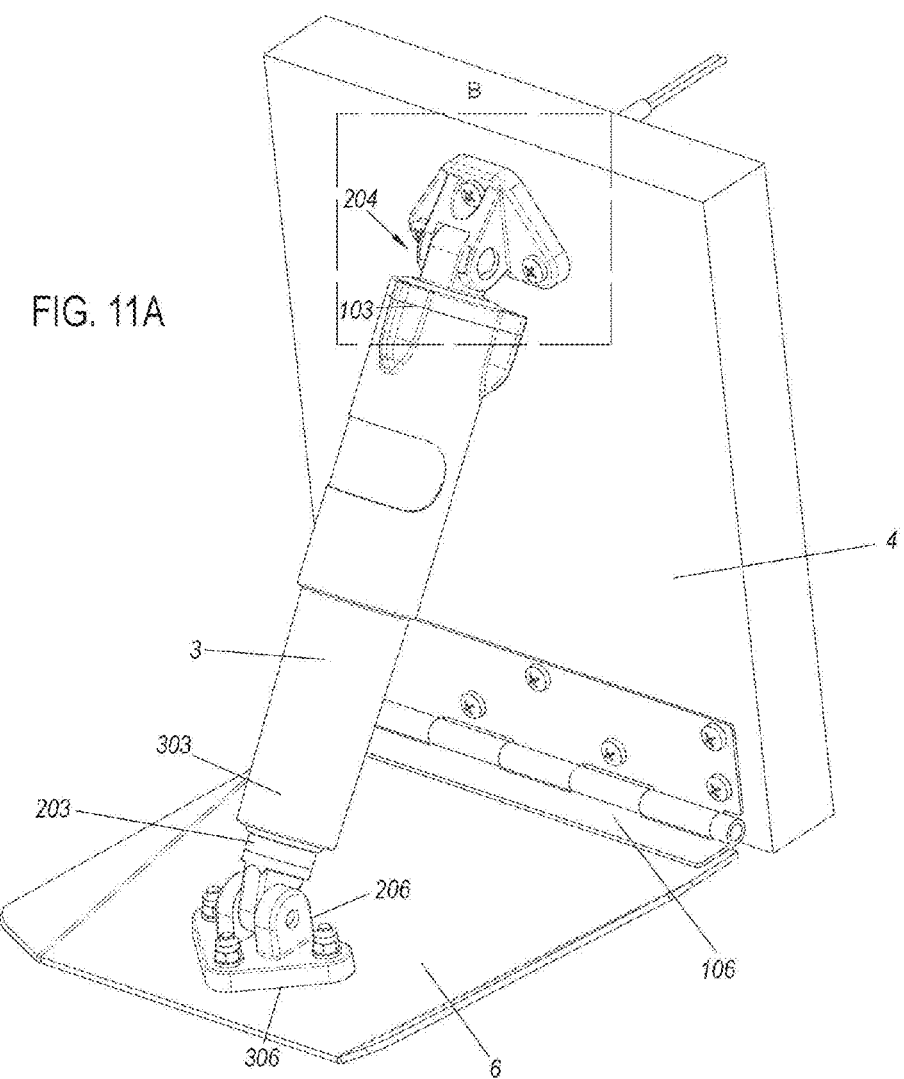
FIG. 11A is a perspective view of the joint as shown in the previous figures, when mounted to one end of a cylinder actuator of a watercraft trim tab system according to the invention.

FIGS. 11A and 11B provide a general view of an attitude control system for a watercraft having trim tabs that incorporate the joint of the invention. The trim tab 6 is connected on one side to the transom wall 4 through the hinge 204 and on the other side to one end 203 of the cylinder actuator 3 through the hinge 206 mounted to the support 306. The hinge 206 is of a conventional type, although it may advantageously be of the type of the invention, for even easier mounting/removal. The opposite end 103 of the cylinder actuator 3 is connected to the wall 4 through a joint of the invention.

Mounting is performed as follows: a hole is formed in the wall 4 for the passage of the power cable or duct 5 of the cylinder 3, then the plate 101 of the joint is mounted using a cable sleeve or a bulkhead feedthrough to ensure watertightness. The cable or duct 5 is introduced into the guide 702 of the second joint part 2, led out of the hole 122 of the cover 502 and then sealed by the cable sleeve 112 before fixing the cover 502 to the upper end 103 of the cylinder 3. Then, the joint is assembled by rotating the cylinder 3 until the flattened portion 302 of the pins 102 of the tab 202 is aligned with the openings 601 of the delimiting wall 501 of the holes 401 of the lugs 301 and by acting transverse thereto in the direction of insertion of the pins 102 into the holes 401. Then, the other end 203 of the cylinder 3 is hinged to the trim tab 6. The maximum stroke of the piston rod 303 of the cylinder 3 defines the maximum relative angular position of the two joint parts 1, 2 and is set to such a value that the disconnection position can never be attained during operation. Therefore, disconnection requires the end 203 of the cylinder 3 to be released in such a manner that the cylinder 3 can rotate to allow the joint parts to attain such position. The maximum elongation of the rod 303 may be electronically or electromechanically controlled by the control transmitted to the actuator or, with a higher reliability, using a mechanical stop member during mounting, or more simply by providing rods 303 of predetermined length according to the joint to be used, e.g. by providing trim tab and joint kits to be sold in a single package.

Figure 12:
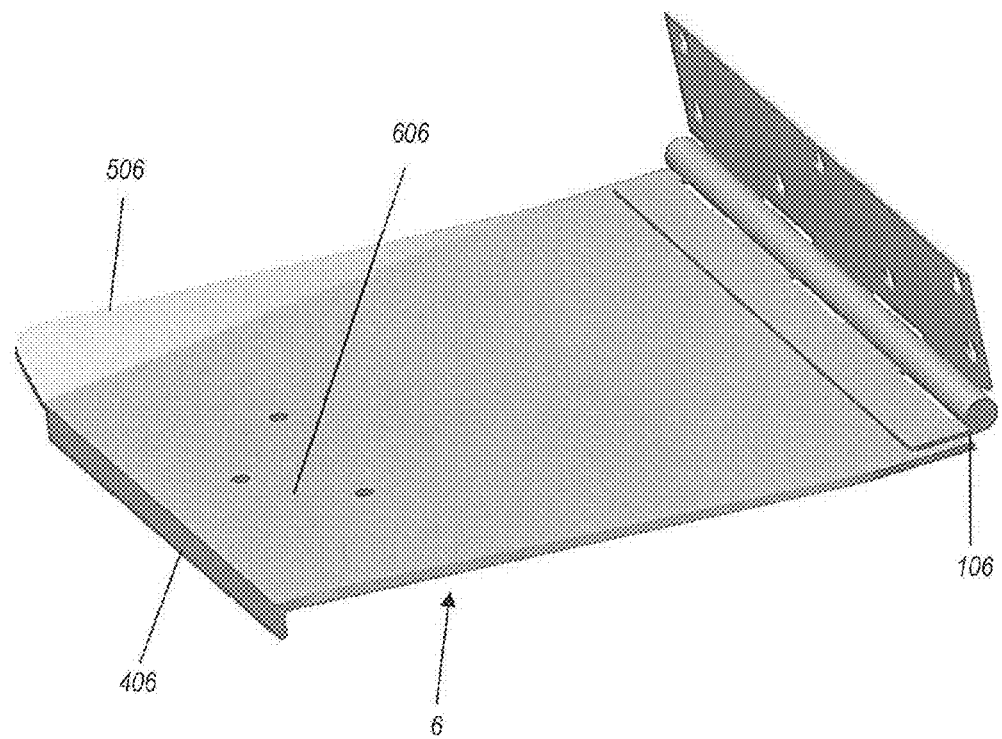
FIGS. 12 and 13 are respectively a top perspective view and a side view of a trim tab or fin according to a preferred embodiment of the invention.
Figure 13:
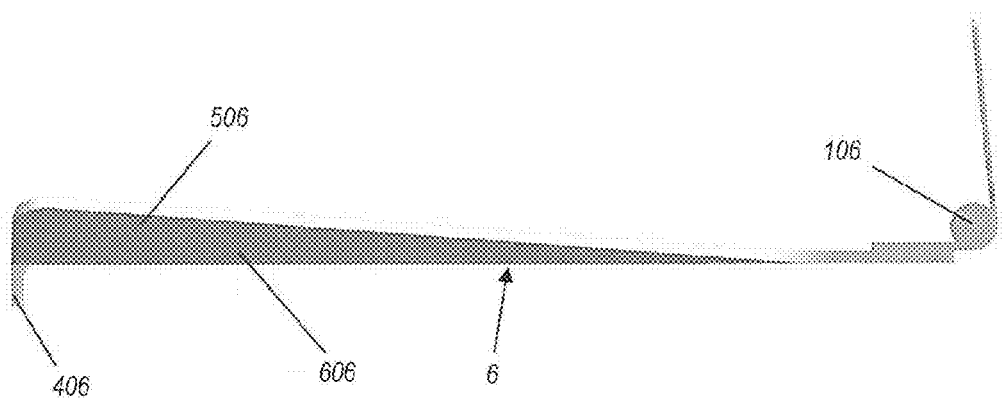

Referring to FIGS. 12 and 13, a trim tab 6 or fin is shown, which has a particularly advantageous fluid-dynamic trimming conformation. Namely, the trim tab 6 or fin has a rib or tooth, at the transverse edge opposite to the hinging end 106 of the trim tab, which projects downwards beyond the underside of the trim tab 6 or fin. In the figures, the rib or tooth are designated by numeral 406 and extend throughout the rear, transverse side of the trim tab 6 or fin. When, like in this particular embodiment, the trim tab 6 or fin has its longitudinal edge, i.e. the edge oriented longitudinally to the hull, equipped with a lateral fin 506 inclined in relation to the rest of the trim tab, particularly upwards, and when the lateral fin 506 terminates at its rear transverse edge to join the rear transverse edge of the rest of the trim tab, then the rib or tooth 406 only extends along the rear transverse edge of that part of the trim tab 606 that does not form the longitudinally inclined lateral fin 506.

The end rib or tooth 406 may have various inclinations in relation to the part of the trim tab 606, from whose transverse rear side it projects. In the embodiment of the figures, the rib or tooth 406 is oriented substantially perpendicular to the underside of the part of the trim tab 606 with which it is joined.

Concerning the length of the rib, i.e. the projection thereof from the underside of the part of the trim tab 606 with which it is joined, said length is from about 1/15 to 1/50 of the overall length of the trim tab 6 or fin from the transverse hinging side to the rear transverse side, with which said rib or tooth 406 is joined. Nevertheless, in the illustrated embodiment such projection can never fall out of a range from 0.5 mm to 50 mm.

According to yet another advantageous embodiment, the invention has automatic devices for moving the trim tabs 6 or fins into the neutral, i.e. rest position, in which they have no trimming action when the watercraft is put in neutral, i.e. when the inverter is controlled into the idle state, for instance by disconnecting the shaft for transmitting motion to the propeller from the drive shaft.

Manual control members, such as levers or the like, are typically provided to switch among neutral, forward and reverse gears, and operate by mechanical, electromechanical, power-assisted or electronic transmission on the inverter controlling actuators. A safety switch is further provided in combination with those control members to reset the operating units to neutral. Such switch is automatically actuated by the gear lever and, in a preferred embodiment, also acts to generate a signal for moving the trim tab/s 6 into the rest or neutral position.

Figure 14:
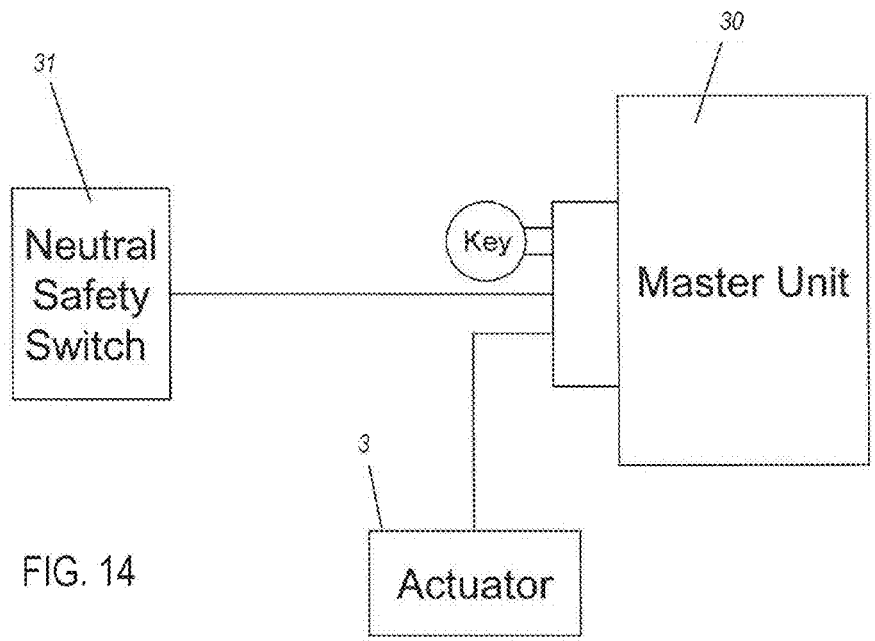
FIG. 14 shows a general block diagram of a control circuit for controlling the blade or trim tab actuator in a device as shown in the previous figures, in which a switch known as Neutral Safety Switch is associated with the neutral state of the motor and is automatically switched, when the motor is in neutral, to generate a signal of displacement of the trim tab/s to the neutral trim position.

Referring now to FIG. 14, the trim tab driving actuators 3 are controlled by a master unit 30, which supplies power for the time required to set a predetermined angular position of the trim tabs 6. Such master unit 30 has inputs for connection to a switch that is designed to generate a control for moving the trim tab/s 6 into said neutral position, which inputs are connected to the two contacts of the switch 31 known as Neutral Safety Switch.

Figure 15:
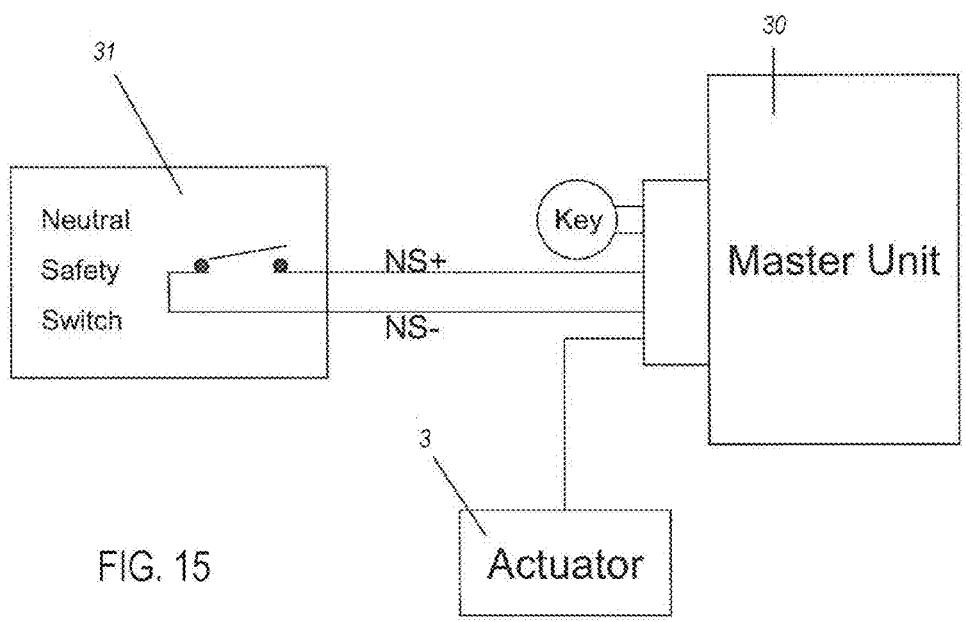
FIGS. 15 to 17 show three different alternative modes of connection of the neutral safety switch that drives the trim tabs to neutral as soon as the motor is put in neutral.
Figure 16:
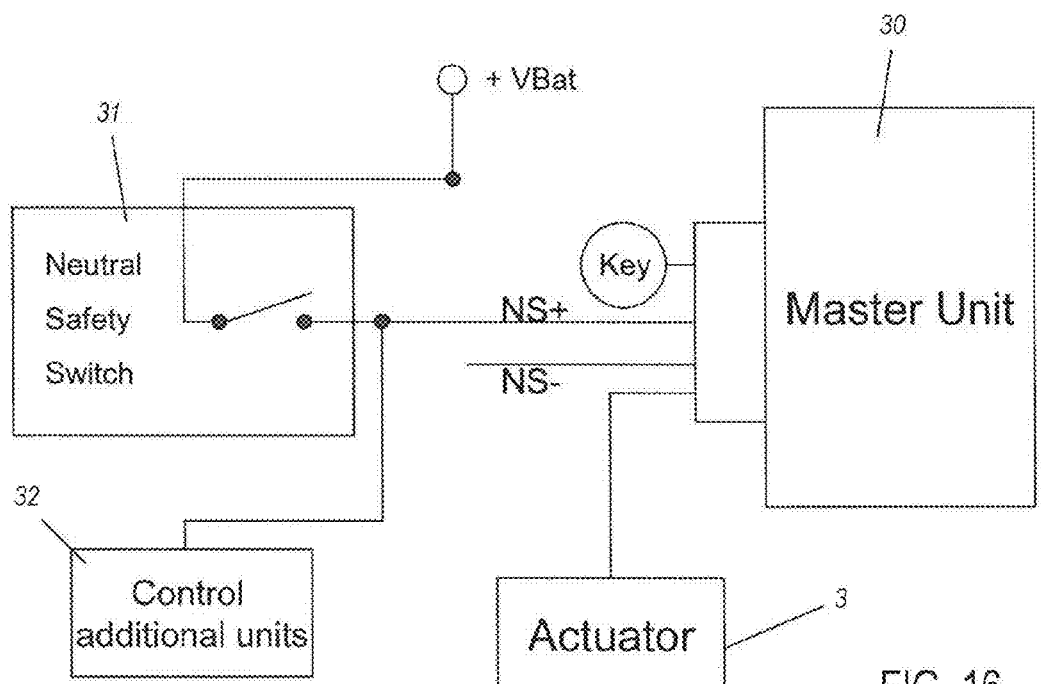
Figure 17:
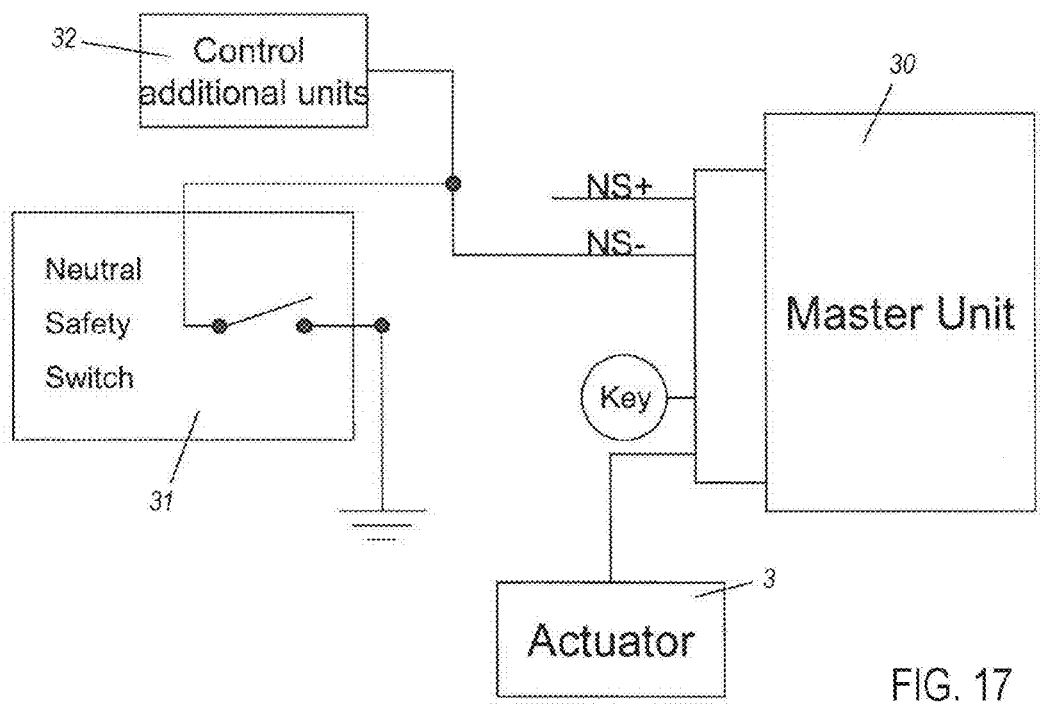

As shown in FIGS. 15 to 17, the switch 31 may be used in various circuit configurations.

In the embodiment of FIG. 15, the switch only generates a short-circuit condition in two ports of the master unit 30, designated as NS+ and NS−. In the closed state, the master board 30 drives the actuators 3 to move the trim tabs 6 into the above mentioned neutral position.

In the embodiment of FIG. 15, the Neutral Safety Switch 31 is a simple switch that is connected to no particular unit and that may be directly connected to the ports NS+ and NS− of the Master Unit 30. These ports have no polarity, wherefore no connection problem arises.

In the embodiments of FIGS. 16 and 17, the Neutral Safety Switch 31 can control additional units, which are generally designated by numeral 32. Here, in the circuit of FIG. 16, the Neutral Safety Switch 31 is again a simple switch, one having contacts connected to the positive pole of the battery, designated as +VBat, whereas the other contact of the switch is connected to the units 32 and to an input port NS+ of the master unit 30 that controls the actuator/s 3 of the trim tabs 6, which also acts as a unit.

The embodiment of FIG. 17 is a variant, in which the Neutral Safety Switch 31 is interposed between the port NS− of the master unit that is connected to one of the contacts of the switch and the ground pole that is connected to the other contact of the switch 31. The same contact of the switch 31 is used to connect with the port NS− of the master unit 30 and the other units 32.

The above variants show that the use of the Neutral Safety Switch 31, which is generally supplied as part of the watercraft control equipment, may be extended to the control for moving the trim tab/s back into the neutral position, considering the trimming function and the above mentioned definition of neutral position. Regardless of the settings of the circuit that is already present on board and of the type of the additional units controlled by the Neutral Safety Switch 31, such Neutral Safety Switch 31 may be also connected to the Master Unit 30 that controls the actuator/s 3, so that, when the switch 31 is actuated by the inverter control lever to set the neutral gear, a control is generated for moving the trim tab/s into the neutral position.

The invention is not limited to the embodiments described and illustrated herein but may be greatly varied, especially as regards construction. For example, the joint may be used, still in marine applications, for connecting to the cylinder actuator of a hatch lifter, or in any other field that requires the use of a hinge connection with separable parts. All these applications and equivalents thereof are without departure from the guiding principle of the invention as disclosed above and claimed below.

What is claimed is:

1. A joint for connecting a cylinder actuator of a trim tab to a watercraft comprising:
    a first part configured to be fixed to a wall of the watercraft;
    a second part configured to be fixed to one end of the cylinder actuator;
    a pin integral with one of the first or the second parts; and
    a pin seat formed in the other one of the first and the second parts and adapted to cooperate with the pin to form a hinge connection,
    wherein the seat is defined by a portion of a circular cylindrical surface having one or more openings on one side for introduction and removal of the pin into and from the seat and an angular extension larger than 180°, the pin comprising a cylindrical portion having one or more lateral flattened surfaces for introduction into the one or more openings of the seat, and
    wherein the one or more openings of the seat and the one or more flattened surfaces of the pin are provided in such angular positions to enable an operable mutual connection and disconnection of the first part with the second part by disposing the first part in a predetermined angular position in relation to the second part during assembly, the predetermined angular position being unattainable by the joint in a mounted operating condition of the cylinder actuator.

2. The joint as claimed in claim 1, wherein at least a portion of the pin that is adapted to cooperate with the seat has a cross section shaped as a circular segment having an angular extension larger than 180° and further has a height smaller than a width of one of the one or more openings of the seat.

3. The joint as claimed in claim 1, wherein the first part or the second part comprises a fixing plate having a pair of lugs each defining a coaxial cylindrical hole sized for free rotation of the pin therein, each hole being delimited by a wall having one of the one or more openings for insertion of the pin therein in a direction transverse to the axes of the holes by causing the one or more flattened surfaces of the pin to align with the openings by rotating the one of the first or the second joint parts relative to the other one of the first or the second joint parts.

4. The joint as claimed in claim 3, wherein the one of the first or the second parts that is integral with the pin comprises a tab having two opposed flat surfaces, the lugs being sufficiently spaced to enable an interposition of the tab to be between the lugs after the operable mutual connection.

5. The joint as claimed in claim 4, wherein the tab has two coaxial pin stumps extending from opposed surfaces of the tab, the pin stumps being designed to engage with the holes defined by the lugs.

6. The joint as claimed in claim 5, wherein each pin stump is disposed orthogonally to the opposed surfaces of the tab and includes the one or more lateral flattened surfaces that extend for at least a part of the pin stump and that are of such size to allow passage of the pin stump through the openings when the one or more lateral flattened surfaces are brought into an alignment position with the one or more openings by rotating the tab relative to the fixing plate or vice versa, the alignment position being a relative angular position of the one or more openings and the one or more lateral flattened surfaces which cannot be attained when the actuator is in the mounted and operating state.

7. The joint as claimed in claim 5, wherein the pin or pin stumps are bonded, welded, formed of one piece, interference fit, or fastener engaged with the tab to project from the opposite surfaces of the tab.

8. The joint as claimed in claim 5, wherein the lugs are bonded, welded, formed of one piece, interference fit, or fastener engaged with the fixing plate.

9. The joint as claimed in claim 5, wherein the lugs are connected together at the side opposite to the openings.

10. The joint as claimed in claim 5, wherein the first part and the second part have perfectly mating shapes in an engaged state.

11. The joint as claimed in claim 5, wherein the first part and the second part have an internal guide passage for holding a power duct or cable of the cylinder actuator.

12. The joint as claimed in claim 11, wherein the internal guide passage comprises an essentially central opening or conduit formed in the tab and a corresponding opening formed in the fixing plate, the corresponding opening being designed to be aligned with the opening or conduit of the tab at a predetermined angular position of the joint.

13. The joint as claimed in claim 12, wherein the predetermined angular position of alignment of the opening with the corresponding opening corresponds to the predetermined angular position for connection and disconnection of the joint parts.

14. The joint as claimed in claim 11, wherein an end section of the internal guide passage is widened at an end of the joint part that comprises the pin or pin stumps and that faces toward the fixing plate, such to allow the first and the second parts to oscillate one in relation to the other when the internal guide passage holds the power duct or cable, the widened end section extending angularly about an axis parallel to an axis of oscillation of the first and the second parts.

15. The joint as claimed in claim 11, further comprising means for fastening the first or the second part that includes the pin seat to a watercraft wall and means for fastening the first or the second part that includes the pin to the one end of the cylinder actuator.

16. The joint as claimed in claim 15, wherein the means for fastening the first part and the second part are respectively coupled to the fixing plate and the tab.

17. The joint as claimed in claim 16, wherein the fastening means coupled to the tab comprise a terminal designed to be press fitted or screwed into a corresponding element of the cylinder actuator.

18. The joint as claimed in claim 17, wherein the terminal comprises or is integral with a head or a cover of the cylinder actuator.

19. The joint as claimed in claim 18, wherein the terminal has one or more peripheral holes for receiving a fastener.

20. The joint as claimed in claim 18, wherein the terminal has an outlet hole for the duct or cable that is received in the guide passage, further comprising watertight fastening means between the duct or cable and the outlet hole.

21. The joint as claimed in claim 20, wherein the watertight fastening means comprise a cable sleeve disposed against the head or cover of the cylinder actuator and extending from an interior of the cylinder at least to the first part or the second part.

22. The joint as claimed in claim 5,
wherein the lugs supporting the pin or pin stumps include recesses for receiving ends of the pin or the pin stumps within parallel walls and form a fork-shaped support for the pin or pin stumps, the fork-shaped support having the one or more openings for receiving the pin ends or the pin stumps with widths smaller than a largest diameter of the pin or pin stumps, and
wherein the lateral flattened surfaces of the pin or pin stumps are dimensioned to be fitted into the recesses during the assembly, the lateral flattened surfaces and the openings of the seat being in such position relative to an angular operating position of the cylinder actuator that the lateral flattened portions of the pin or pin stumps are prevented to angularly align with the one or more seat openings and slip off the one or more seat opening during operation of the cylinder actuator.

23. A cylinder actuator for watercraft a trim tab comprising:
an open end designed to be connected with the head or cover of a joint as claimed in claim 18.

24. A cylinder actuator for watercraft trim tabs provided in combination with a joint as claimed in claim 1.

25. A watercraft comprising:
at least one trim tab hinged to a transom for attitude control,
wherein the at least one trim tab is driven by a cylinder actuator connected to the transom with a joint as claimed in claim 1.

26. A control system for controlling the attitude of a watercraft comprising:
a trim tab hinged to a transom of the watercraft;
a cylinder actuator hinged at one end to the trim tab and at another end to the transom, the cylinder actuator comprising a piston rod;
a joint as claimed in claim 1 operatively connecting the cylinder actuator to the transom;
a hydraulic or electric control device connected to the cylinder actuator through a pneumatic duct or an electric cable partially held in an internal guide passage of the joint, the piston rod of the cylinder having a maximum length such that, in operation, an angular position corresponding to a disengagement state of the first and the second parts of the joint parts is not attained.

27. A control system for controlling the attitude of a watercraft comprising:
one or more trim tabs hinged to a transom of the watercraft;
a cylinder actuator hinged at one end to the one or more trim tabs and another end to the transom;
a joint connecting the cylinder actuator to the transom;
a hydraulic or electric control device connected to the cylinder actuator through a pneumatic duct or an electric cable;
a control unit supplying power to the cylinder actuator;
a gear selector connected to the control system and configured to select from at least a forward gear and a neutral gear;
means for generating a control signal moving the one or more trim tabs into a neutral position having no trimming operation, wherein the means for generating the control signal are configured to transmit the control signal at the same time as the neutral gear is selected, and
a switch controlled by the gear selector, the gear selector having contacts that provide an open and close connection via a control signal to a control port of the control unit, wherein the switch is a Neutral Safety Switch configured to be coupled to a control lever of the gear selector by controlling an inverter, and wherein the control unit comprises a pair of control ports for transmitting the control signal to move the one or more trim tabs into the neutral position, the control signal being generated by a short circuit condition of the control ports of the control unit provided by the switch, the switch having a plurality of electrodes and further having each of the control ports connected to one of the electrodes.

28. A control system for controlling the attitude of a watercraft comprising:
one or more trim tabs hinged to a transom of the watercraft;
a cylinder actuator hinged at one end to the one or more trim tabs and another end to the transom;
a joint connecting the cylinder actuator to the transom;
a hydraulic or electric control device connected to the cylinder actuator through a pneumatic duct or an electric cable;
a control unit supplying power to the cylinder actuator;
a gear selector connected to the control system and configured to select from at least a forward gear and a neutral gear; and
means for generating a control signal moving the one or more trim tabs into a neutral position having no trimming operation, wherein the means for generating the control signal are configured to transmit the control signal at the same time as the neutral gear is selected,
wherein the control unit comprises a pair of control ports for transmitting the control signal to move the one or more trim tabs into the neutral position, a first one of the ports being connected to a positive pole of a battery, or a second one of the ports being connected to a ground pole, and a switch being interposed between the first one of the ports and the positive pole of the battery or between the second one of the ports and the ground pole.

29. The control system as claimed in claim 28, wherein the control system comprises at least two trim tabs each hinged to the transom in areas that are symmetrical to a longitudinal center axis of the watercraft.

* * * * *